(12) United States Patent
Miyazaki et al.

(10) Patent No.: US 6,249,098 B1
(45) Date of Patent: Jun. 19, 2001

(54) WIPER CONTROL APPARATUS AND METHOD CAPABLE OF VARIABLY ADJUSTING WIPER BLADE MOTION

(75) Inventors: Naomi Miyazaki, Okazaki; Masashi Nakata, Toyohashi; Yasuaki Uchida, Kosai; Akio Oshiro, Hamamatsu, all of (JP)

(73) Assignee: ASMO Co., Ltd., Shizuoka-Pref (JP)

( * ) Notice: Subject to any disclaimer, the term of this patent is extended or adjusted under 35 U.S.C. 154(b) by 0 days.

(21) Appl. No.: 09/420,044

(22) Filed: Oct. 18, 1999

(30) Foreign Application Priority Data

Mar. 5, 1999 (JP) .................................. 11-058831

(51) Int. Cl.[7] ................ H02P 1/00; H02P 1/22; H02P 1/40; H02P 3/00; H02P 3/20
(52) U.S. Cl. ..................... 318/280; 318/DIG. 2; 318/282; 318/283; 318/286; 318/443; 318/444; 15/250.12
(58) Field of Search ............... 318/DIG. 2, 280, 318/281, 282, 283, 286, 443, 444; 15/250.001, 250.12, 250.16, 250.17

(56) References Cited

U.S. PATENT DOCUMENTS

| | | | |
|---|---|---|---|
| 4,663,575 | * 5/1987 | Juzswik et al. | 318/444 |
| 4,665,488 | 5/1987 | Graham et al. | . |
| 4,710,878 | * 12/1987 | Iyoda | 364/424 |
| 4,866,357 | * 9/1989 | Miller et al. | 318/443 |
| 5,166,587 | * 11/1992 | Smart | 318/444 |
| 5,256,950 | * 10/1993 | Matsumoto et al. | 318/443 |
| 5,506,483 | * 4/1996 | McCann et al. | 318/444 |
| 5,861,723 | 1/1999 | Koch | . |
| 5,909,096 | * 6/1999 | Detais | 318/282 |
| 5,929,588 | * 7/1999 | Shiah | 318/653 |
| 5,998,949 | * 12/1999 | Amagasa | 318/280 |
| 6,002,323 | * 12/1999 | Bomya | 340/384.1 |
| 6,011,369 | * 1/2000 | Grass | 318/445 |

FOREIGN PATENT DOCUMENTS

| | | |
|---|---|---|
| 59-92235 | 5/1984 | (JP) . |
| 11-11259 | 6/1997 | (JP) . |
| 11-2798733 | 7/1998 | (JP) . |
| 98/40252 | * 9/1998 | (WO) ............... B60S/1/08 |

* cited by examiner

Primary Examiner—Robert E. Nappi
Assistant Examiner—Edgardo San Martin
(74) Attorney, Agent, or Firm—Fish & Richardson P.C.

(57) ABSTRACT

A wiper blade wipes over a predetermined range of a front windshield in response to rotation of a wiper motor in a forward and reverse directions. The wiper blade operates in a wiping range between a predetermined upper reversing position and a predetermined lower reversing position. An upper pre-reversing position is defined inside of the upper reversing position, and a lower pre-reversing position is defined inside of the lower reversing position. A rotation sensor produces pulse signals in response to the rotation of the wiper motor. A CPU counts the pulse signals produced from the rotation sensor when a position detection sensor detects an arrival of the wiper blade at the pre-reversing position. The CPU produces a control signal to a drive circuit and reverses the direction of the drive current of the wiper motor to reverse the rotation of the wiper motor, when the pulse count value reaches a predetermined value.

25 Claims, 7 Drawing Sheets

WIPER CONTROL APPARATUS AND METHOD CAPABLE OF VARIABLY ADJUSTING WIPER BLADE MOTION

CROSS REFERENCE TO RELATED APPLICATION

This application relates to and incorporates herein by reference Japanese Patent Application No. 11-58831 filed on Mar. 5, 1999.

BACKGROUND OF THE INVENTION

1. Field of the Invention

The present invention relates to a wiper control apparatus and method for appropriately controlling the wiping operation of a wiper blade.

2. Description of Related Art

A conventional wiper apparatus for vehicles drives a wiper blade into a reciprocal wiping operation by reversing the direction of rotation of a wiper motor as disclosed in JP 2798733. In this apparatus, pre-reversing positions are set inside of the upper and lower reversing positions of the wiper blade, and a cam switch is provided within the wiper motor to detect the pre-reversing positions and the reversing positions.

Further, in this apparatus, the rotation of the wiper motor is reduced by initiating a PWM control when it is detected that the wiper motor arrives at the pre-reversing position. The rotation of the wiper motor is reversed after the detection of an arrival at the reversing position. As a result, a counter electromotive force which is generated at the reversing position is reduced, so that the wiper blade attains a stable wiping operation.

In the above apparatus, however, the upper and lower reversing positions in the wiping operation are set by the cam switch which is mechanically fixed. The wiping ranges will be set differently in the case that the above control apparatus is applied to wiper devices having different device rigidity from each other or to vehicles having different body rigidity from each other. That is, because the wiping load and the body rigidity differs from vehicle to vehicle, the same predetermined wiping range (wiping angle) cannot be ensured. Thus, an over-running in which the wiper blade is over-driven beyond the predetermined reversing position is likely to occur. In this instance, the cam switch or the like must be changed. Thus, the same motor cannot be applied to the different type of vehicles. Further, it cannot be applied either to the same vehicle type in the case that the vehicle rigidity is different.

SUMMARY OF THE INVENTION

The present invention therefore has an object to provide a wiper control apparatus which is capable of adjusting a wiper blade motion variably.

According to the present invention, a pre-reversing position is defined inside of a wiping range of a wiper blade defined by an upper reversing position and a lower reversing position. A rotation sensor produces a pulse signal every angular rotation of a wiper motor which drives the wiper blade. The pulse signal produced from the rotation sensor after an arrival of the wiper blade at the pre-reversing position is counted. A drive circuit reverses the direction of the drive current supplied to the wiper motor to reverse the rotation of the wiper motor and hence the movement of the wiper blade, when the pulse count value reaches a predetermined value.

Preferably, the drive circuit controls the drive current to decrease gradually after the arrival of the wiper blade at the pre-reversing position to decelerate the motion of the wiper blade before arriving at the reversing position.

Further, the predetermined value is varied by a parameter indicative of a wiping operation of the wiper blade. The parameter may be a wiper switch position, a vehicle speed, a wetting condition of a windshield, a detection of a movement of the wiper blade into an area beyond the wiping range of the wiper blade or the like.

BRIEF DESCRIPTION OF THE DRAWINGS

The above and other objects of the present invention will become more apparent from the following detailed description made with reference to the accompanying drawings. In the drawings.

DETAILED DESCRIPTION OF THE PREFERRED EMBODIMENT

Figures 1, 8:
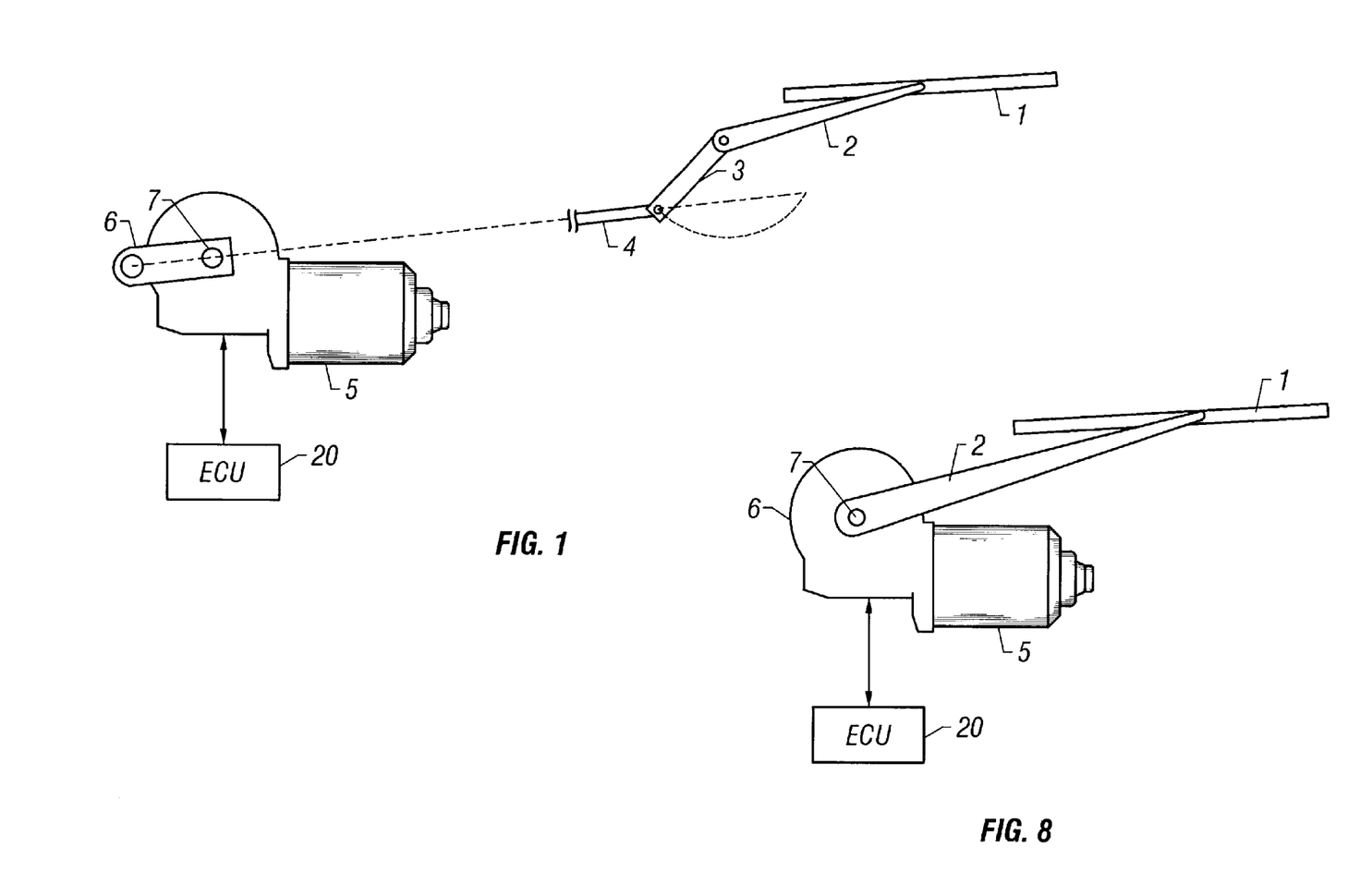
FIG. 1 is a schematic view showing a wiper control apparatus according to an embodiment of the present invention.
FIG. 8 is a schematic view showing a wiper control apparatus according to a modification of the embodiment.

Referring first to FIG. 1, a wiper blade 1 is held by a wiper arm 2 which is coupled with a lever 3 through a pivot axis. The lever 3 is coupled with a crank arm 6 of a wiper motor 5 through a link rod 4. The wiper motor 5 is constructed to be capable of rotating in a forward and reverse directions so that the crank arm 6 rotates about 180 degrees reciprocally in the forward and reverse directions in response to the forward and reverse rotations of the wiper motor 5. The wiper arm 2 operates reciprocally through the link rod 4 and the lever 3 in response to the rotation of the crank arm 6, so that the wiper blade 1 wipes the front windshield over a predetermined wiping range. The rotation of the wiper motor 5 is reduced by a worm gear as a speed reduction mechanism, so that the wiper blade 1 is moved slower than the rotation of the wiper motor 5. The forward and reverse rotation operation of the wiper motor 5 is controlled by an ECU 20.

Figure 2:
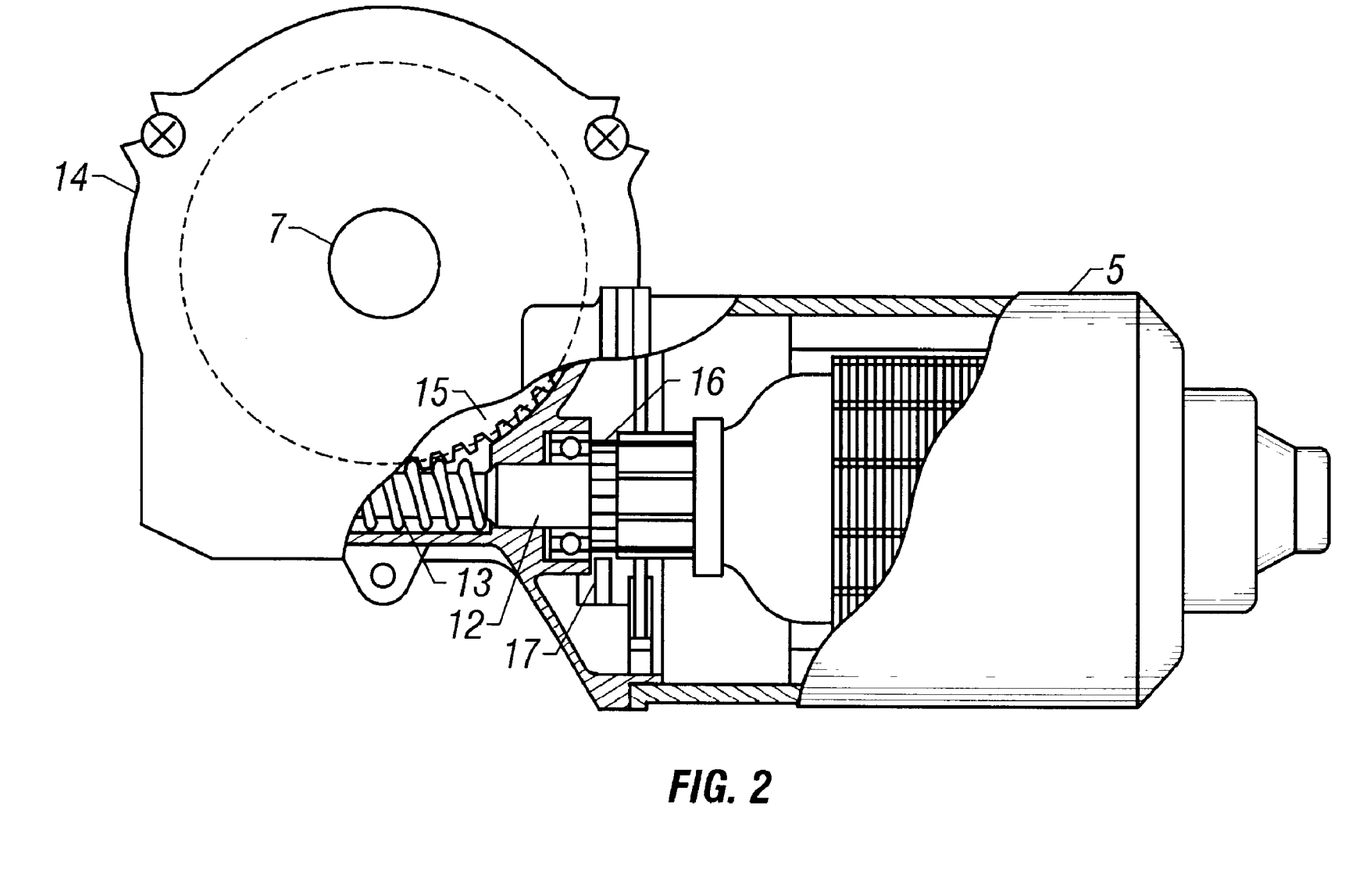
FIG. 2 is a front view showing partly in section a wiper motor used in the embodiment.

In the wiper motor 5, as shown in FIG. 2, a worm 13 is formed on a rotary shaft 12 of the wiper motor 5. The worm 13 is in meshing engagement with a gear wheel 15 accommodated within a casing 14. Thus, when the rotary shaft 12 rotates, its rotation is reduced in speed and transmitted to an output shaft 7 with a speed transmission ratio of 1/60, for instance, through the worm 13 and the gear wheel 15.

A magnet ring 16 is fixed around the rotary shaft 12. The magnet ring 16 is magnetized into N-pole and S-pole alternately at a uniform angular interval over its outer periphery. A rotation sensor 17 comprises a magneto-resistance device and is disposed to face the magnet ring 16 in the non-contacting relation, so that the rotation speed of the rotary shaft 12 of the wiper motor 5 may be detected from output signals of the rotation sensor 17. In this embodiment, twelve pulses are produced from the rotation sensor 17 when the rotary shaft 12 of the wiper motor 5 makes one rotation.

Figure 3:
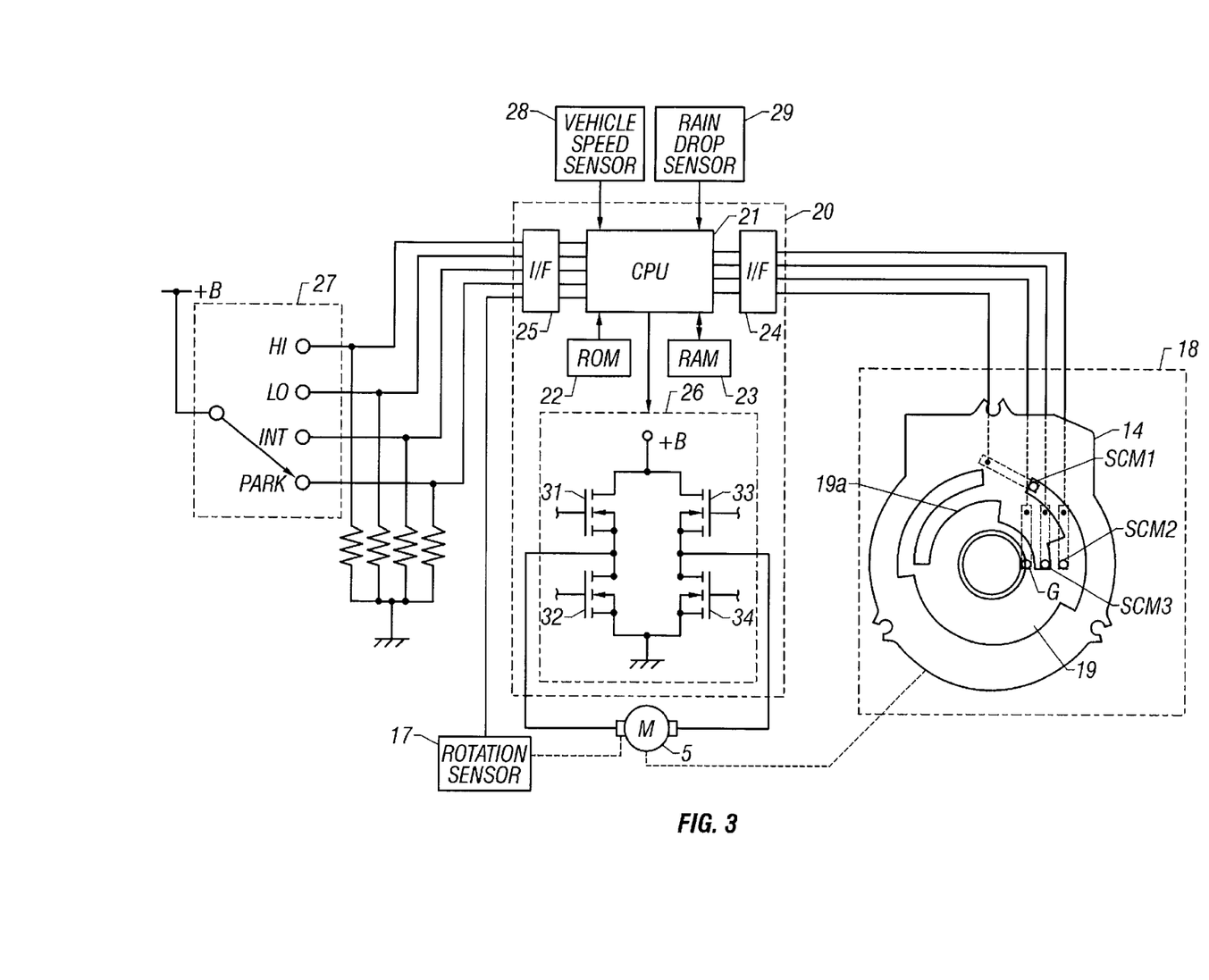
FIG. 3 is a circuit diagram showing an ECU used in the embodiment.

A position detection sensor 18 is accommodated within the casing 14 for detecting the rotational position or angle of the wiper motor 5 and hence the position of the wiper blade 1 as shown in FIG. 3. The position detection sensor 18 in this embodiment has three stationary contacts SCM1, SCM2, SCM3 and a conductive plate 19 as a movable contact.

Specifically, the contacts SCM1, SCM2, SCM3 and a ground contact G are provided in the casing 14 of the wiper motor 5. The contacts SCM1–SCM3, G are fixed to protrude inwardly from the casing 14 in such a manner that the conductive plate 19 fixed to one side surface of the gear wheel 15 slides over the contacts SCM1–SCM3, G. The contacts SCM1–SCM3 function as electrical brushes. The conductive plate 19 is formed partially with a cut-out. As a result, when the gear wheel 15 rotates with the rotation of the wiper motor 5, the sliding contact condition between the contacts SCM1–SCM3 and the conductive plate 19 changes. That is, when the contacts SCM1–SCM3 are positioned on the cut-out 19*a* of the conductive plate 19, the contacts SCM1–SCM3 are held in the non-contact condition with the conductive plate 19.

The ground contact G is grounded to a vehicle chassis. The conductive plate 19 is held at the grounded level (0V) because the ground contact G and the conductive plate 19 are normally in the conductive condition. The contacts SCM1–SCM3 are supplied with a predetermined voltage (for instance, 5V). As a result, when the contacts SCM1–SCM 3 and the conductive plate 19 come into the non-conductive condition, the contacts SCM1–SCM3 become to have the predetermined potential (5V). When the contacts SCM1–SCM 3 and the conductive plate 19 come into the conductive condition, the contacts SCM1–SCM3 become to have the ground potential. Thus, the wiper blade position corresponding to the crank arm position is detected from the signal levels of the contacts SCM1–SCM3 of the position detection sensor 18.

The ECU 20 has, as shown in FIG. 3, a central processing unit (CPU) 21, a read only memory (ROM) 22, a random access memory (RAM) 23, an interface circuit (I/F) 24, 25 and a drive circuit 26. The CPU 21 is for executing a motor control processing based on predetermined control programs. The ROM 22 is for storing the control programs and initial data required for the CPU 21 to execute its control processing. RAM 23 is for temporarily storing calculation results of the CPU 21.

The CPU 21 is connected to the stationary contacts SCM1–SCM3, G of the position detection sensor 18 through the I/F circuit 24 to detect the potential levels of the contacts SCM1–SCM3. The CPU 21 is connected to a wiper switch 27 through the I/F 25 to determine a wiping operation speed of the wiper blade 1 in response to the operation position of the wiper switch 27. The wiper switch 27 has a "HI" position, "LO" position, "INT" position and "PARK" position as operation positions. That is, the wiper blade 1 attains its wiping operation continuously at a high speed when the wiper switch 27 is operated to the "HI" position, while it attains the wiping operation continuously at a low speed when the wiper switch 27 is operated to the "LO" position.

Further, the wiper blade 1 attains its wiping operation intermittently when the wiper switch 27 is operated to the "INT" position, while it stops its wiping operation and stores it when the wiper switch 27 is operated to the "PARK" position.

The CPU 21 is connected to the rotation sensor 17 so that the pulse signals produced in response to the rotation of the wiper motor 5, more specifically the rotation of the magnet ring 16 fixed to the rotary shaft 12 of the motor body, are applied to the CPU 21. Further, in the present embodiment, the CPU 21 is connected to a vehicle speed sensor 28 and a rain drop sensor 29 to detect a vehicle running speed and a wetting condition of the front windshield. The wiper switch 27, vehicle speed sensor 28 and rain drop sensor 29 are used to detect a wiper load exerted to the wiper blade 1.

The drive circuit 26 has four MOSFETs 31, 32, 33, 34. The CPU 21 controls the MOSFETs 31–34 to drive the wiper motor 5 in the forward and reverse directions by changing the direction of current flowing to the wiper motor 5. Specifically, the CPU 21 turns on the FETs 31, 34 and turns off the FETs 32, 33 to drive the wiper motor 5 in the forward direction. The CPU 21 turns on the FETs 32, 33 and turns off the FETs 31, 34 to drive the wiper motor 5 in the reverse direction. The CPU 21 has a pulse width modulation (PWM) function to control the drive current supplied to the wiper motor 5 by applying a pulse width modulated signal of a predetermined duty to the drive circuit 26. Thus, the rotation speed of the wiper motor 5 is adjusted. The PWM control in the present embodiment is executed based on the internal clock of the CPU 21. Further, the present wiper control apparatus has a dynamic braking function in which both brushes of the wiper motor 5 are shorted to stop rotation.

Figure 4:
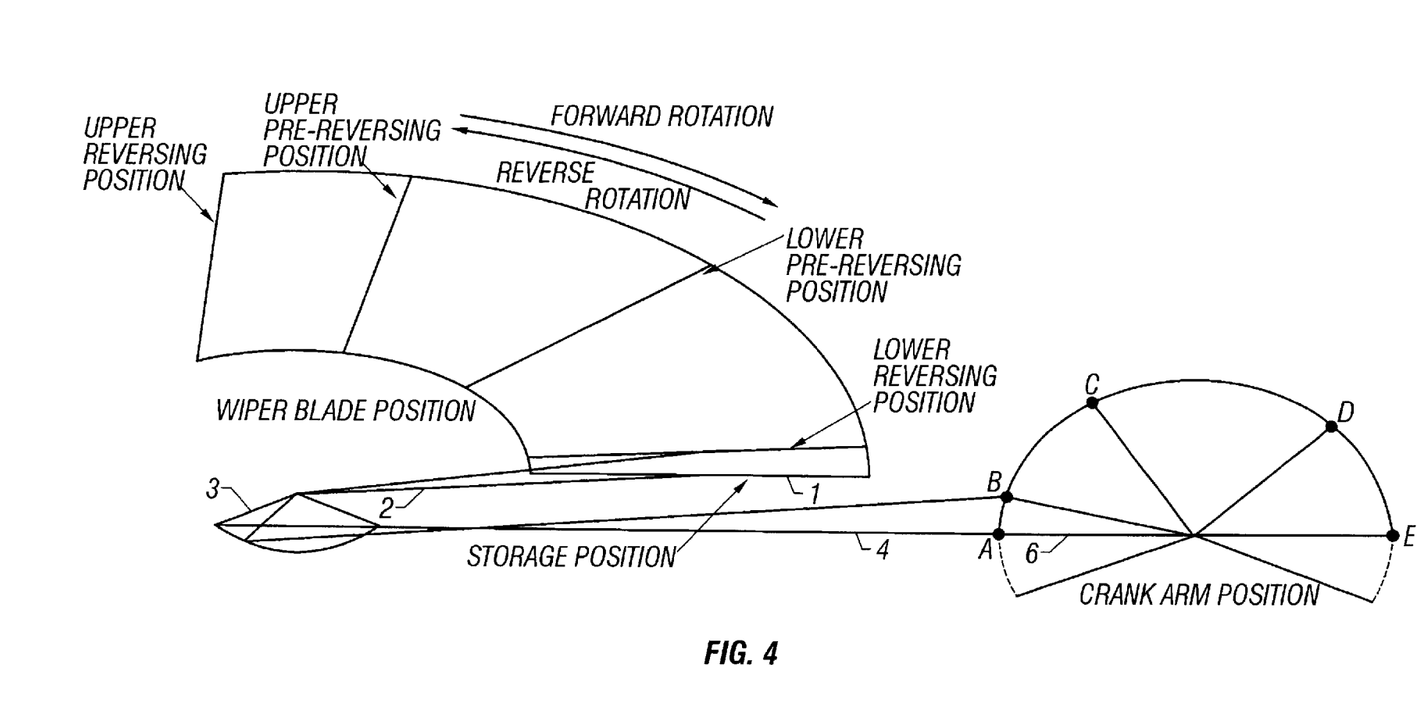
FIG. 4 is a schematic view showing a wiping range of a wiper blade in the embodiment.

The principal operation of the wiper control apparatus is described next with reference to FIG. 4 showing the relation between the crank arm positions and the wiper blade positions. When the wiper motor 5 rotates in the forward direction, the crank arm 6 moves in the order of A, B, C, D, E in the figure, and the wiper blade 1 moves from a storage position to an upper reversing position. When the wiper motor 5 rotates in the reverse direction, the crank arm 6 moves in the order of E, D, C, B, and the wiper blade 1 moves from the upper reversing position to a lower reversing position. An upper pre-reversing position is defined at a position inside of or in advance of the upper reversing position, and a lower pre-reversing position is defined at a position inside of or in advance of the lower reversing position.

Specifically, when the crank arm 6 moves from the point A to the point B, the wiper blade 1 moves from the storage position to the lower reversing position. Then, when the crank arm 6 moves from the point B to the point D, the wiper blade 1 moves from the lower reversing position to the upper pre-reversing position. Further, when the crank arm 6 moves from the point D to the point E, the wiper blade 1 moves from the upper pre-reversing position to the upper reversing position.

When the crank arm 6 moves from the point E to the point C after the wiper blade 1 arrives at the upper reversing position, the wiper blade 1 moves from the upper reversing position to the lower pre-reversing position oppositely from the above operation. When the crank arm 6 moves from the point C to the point B, the wiper blade 1 moves from the lower pre-reversing position to the lower reversing position. Thereafter, the wiper blade 1 moves reciprocally between the lower reversing position and the upper reversing position in response to the rotation of the wiper motor 5 in the forward and reverse directions. The upper reversing position and the lower reversing position define therebetween a wiping range of the wiper blade 1. When the wiper control is terminated, the crank arm 6 returns from the point B to the point A and the wiper blade 1 is returned from the lower reversing position to the storage position which is lower than the lower reversing position.

When the crank arm 6 rotates in the counterclockwise direction in the figure over-running the point A or the crank arm 6 rotates in the clockwise direction in the figure over-running the point E, the wiper blade 1 moves out beyond the area defined between the storage position and the upper reversing position. In this embodiment, the area beyond the area between the storage position and the upper reversing position is set as a non-entering area into which the wiper blade 1 should not enter.

Generally, the movement of the wiper blade 1 from the storage position to a rise-up position corresponding to the lower reversing position in response to the movement of the crank arm 6 from the point A to the point B at the time of starting the wiper control is defined as a rise-up operation. The movement of the wiper blade 1 from the lower reversing position to the storage position in response to the movement of the crank arm 6 from the point B to the point A at the time of ending the wiper control is defined as a hide-down operation.

The mode by which the movement of the wiper blade 1 is detected when the wiper blade 1 moves as above is described next with reference to FIGS. 5A–5G.

Figure 5A:
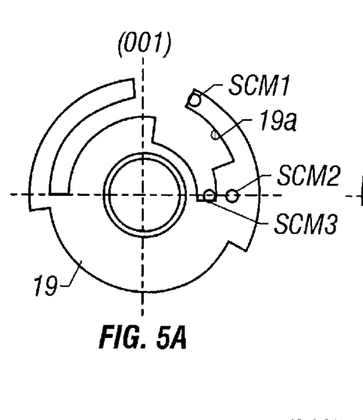
FIGS. 5A–5G are schematic views showing conditions of contacting between contacts and a conductive plate of a position detection sensor used in the embodiment.

That is, when the wiper blade 1 is at the storage position, as shown in FIG. 5A, the contacts SCM1, SCM 2 are in the conductive condition, and the contact SCM3 is in the non-conductive condition. That is, the signal levels produced from the contacts SCM1, SCM2 are at the ground level, and the signal level produced from the contact SCM3 is at 5V. Therefore, the output of the position detection sensor 18 is (001), assuming that the signals of the contacts SCM1, SCM2 contacting the conductive plate 19 are defined as "0" and the signal of the contact SCM3 not contacting the conductive plate 19 is defined as "1".

Figure 5B:
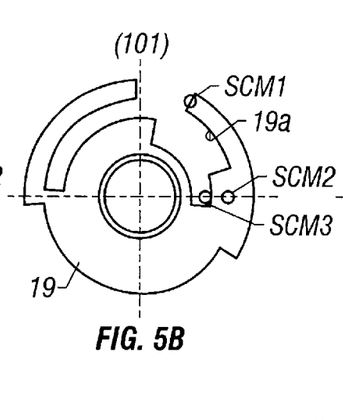
Figure 5C:
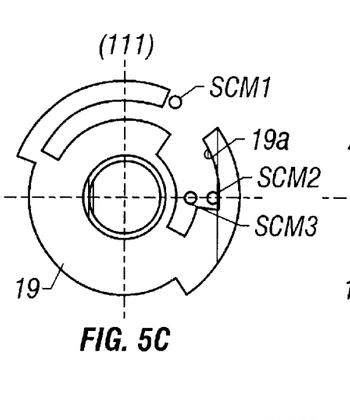

When the wiper blade 1 moves from the storage position to the rise-up position, the conductive plate 19 rotates in the clockwise direction, and the contact SCM1 changes from conductive to non-conductive as shown in FIG. 5B. As a result, the output of the position detection sensor 18 becomes (101). When the wiper blade 1 arrives at the rise-up position, all of the contacts SCM1–SCM3 becomes non-conductive, and the output of the position detection sensor 18 becomes (111) as shown in FIG. 5C.

Figure 5D:
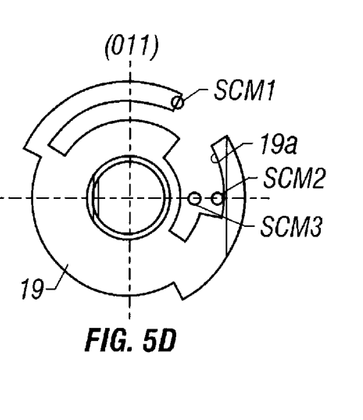
Figure 5E:
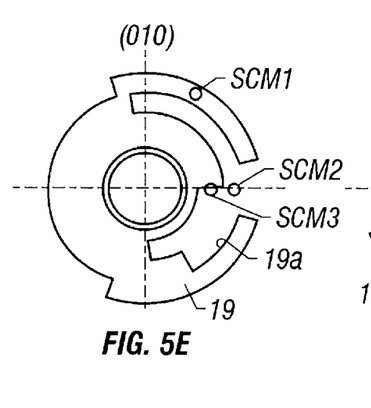
Figure 5F:
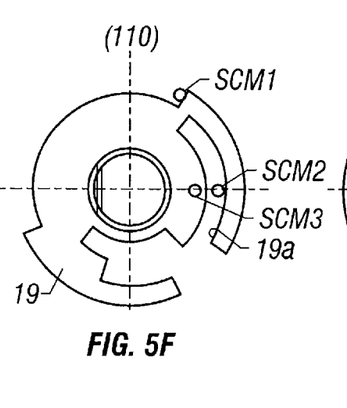

Then, when the wiper blade 1 moves from the rise-up position to the upper pre-reversing position, the contact SCM1 becomes conductive as shown in FIG. 5D, and the contact SCM3 becomes conductive as shown in FIG. 5E. As a result, output of the position detection sensor 18 changes from (111) to (011) and then (010). When it arrives at the upper pre-reversing position, only the contact SCM 1 changes from conductive to non-conductive as shown in FIG. 5F, and the output of the position sensor 18 changes from (010) to (110). Further, when the signal (110) corresponding to the upper pre-reversing position is detected, the rotation of the wiper motor 5 is reversed to reverse the wiper blade 1 at the upper reversing position as described later by counting a predetermined number of pulses produced from the rotation sensor 17.

When the wiper blade 1 moves to the lower pre-reversing position after being reversed at the upper reversing position, the conductive plate 19 rotates in the counterclockwise direction in the figure, and the output of the position detection sensor 18 changes from (110) to (010). When the wiper blade 1 arrives at the lower pre-reversing position, only the contact SCM 3 changes from conductive to non-conductive, and the output of the position sensor 18 changed from (010) to (011). Further, when the signal (011) corresponding to the lower pre-reversing position is detected, the rotation of the wiper motor 5 is reversed to reverse the wiper blade 1 at the lower reversing position as described later by counting the predetermined number of pulses produced from the rotation sensor 17.

Thus, the wiper blade position can be detected accurately by detecting by the CPU 21 the output signal from the position sensor 18 provided on the gear wheel 15 driven by the motor body at the reduced speed. It is to be noted that, in the present embodiment, the shape of the conductive plate 19 and the arrangement of the contacts SCM1–SCM3 are determined to change only one contact condition of the contacts SCM1–SCM3 when the wiper blade 1 moves.

Figure 5G:
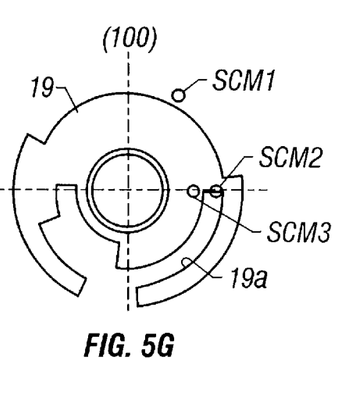

In the above embodiment, as shown in FIG. 5G, a part for causing the position detection sensor 18 to produce (100) is set at a position distanced a predetermined angle from the upper pre-reversing position in the motor forward rotation direction (clockwise direction of the conductive plate 19). A signal is produced at this part to indicate an area into which the wiper blade 1 should not enter (for instance, position at which the wiper blade 1 is likely to hit a vehicle pillar). The reversing operation is normally controlled to occur at the upper reversing position before the wiper blade 1 enters into this area. Similarly, a part for causing the position detection sensor 18 to produce (000) is set at a position distanced a predetermined angle from the storage position in the motor reverse rotation direction (counterclockwise direction of the conductive plate 19). A signal is produced at this part to indicate entering of the wiper blade 1 into this non-entering area. The reversing operation is normally controlled to occur at the lower reversing position before the wiper blade 1 enters into this area. Those non-entering areas are provided for preventing the over-running of the wiper blade 1. The non-entering area need not be provided at both sides of the upper reversing position and the lower reversing position, but may be provided only at the side of the upper reversing position where the running wind is influential on the wiping operation. This non-entering area corresponds to an allowable limit position.

Figure 6:
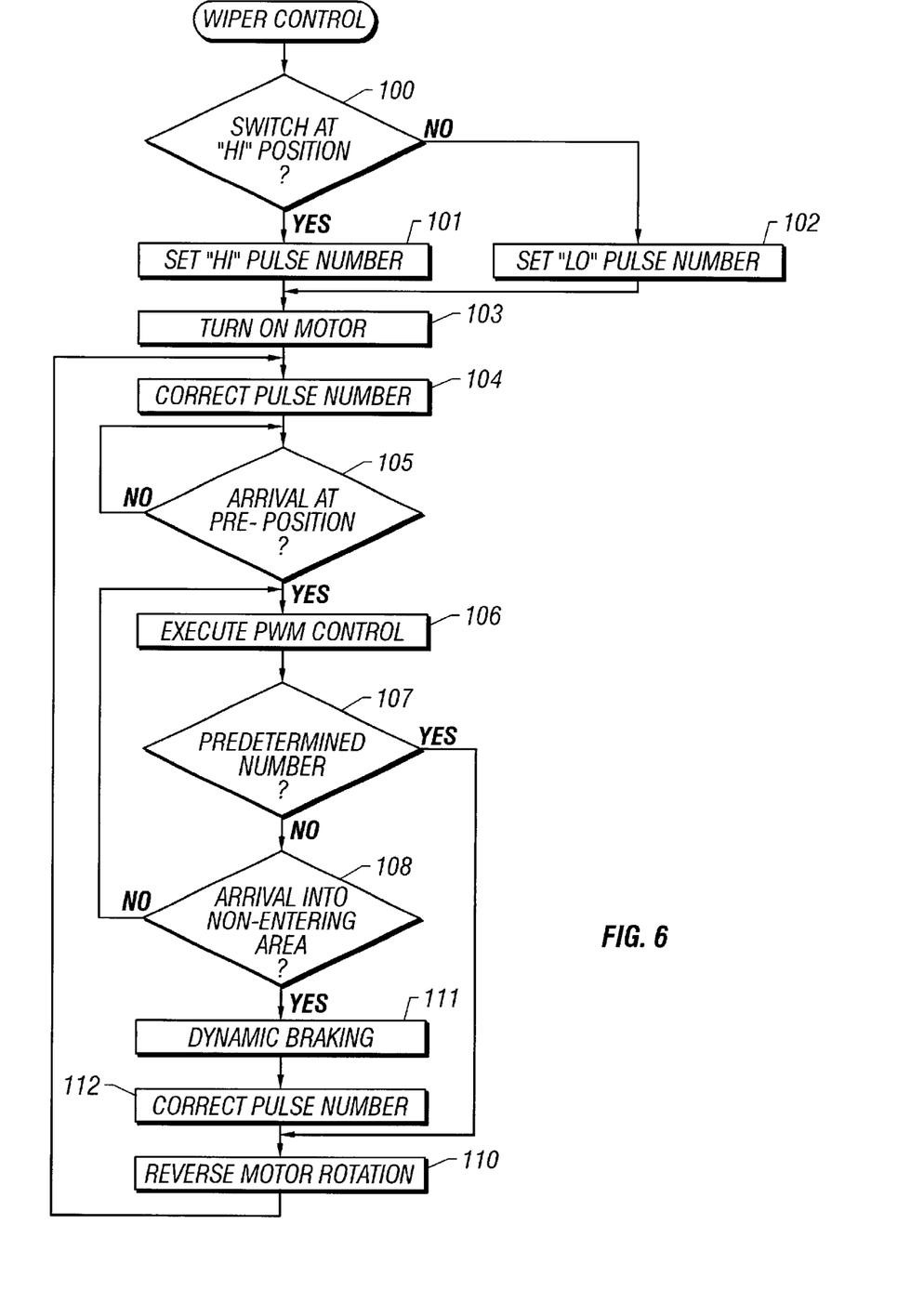
FIG. 6 is a flow diagram showing a wiper motor control processing executed by a CPU used in the embodiment.

The wiper control processing executed by the CPU 21 is described next with reference to FIG. 6. This wiper control processing is initiated by an interruption which is generated when the wiper switch 27 is operated to turn on by a vehicle driver.

First, the CPU 21 checks at step 100 the operation position of the wiper switch 27 from the detection signal from the wiper switch 27 and sets the initial number of pulses to be counted. Specifically, if the wiper switch 27 is operated to the "HI" position, the processing proceeds to step 101 to set the number of pulses for the "HI" operation. If it is operated to the "LO" or "INT" position, the processing proceeds to step 102 to set the number of pulses for the "LO" operation. Here, the number of pulses is set to a smaller number as the initial number of pulses when the wiper switch 27 is operated to the "HI" position than when it is operated to the "LO" position.

Then, the CPU 21 produces at step 103 a drive signal to the drive circuit 26 to rotate the wiper motor 5 at a target rotation speed. The CPU 21 corrects at step 104 the initial number of pulses set at step 101 or 102 based on the vehicle speed and the wetting condition of the front windshield, and sets a target number of pulses which are used for a deceleration control executed at around the upper reversing position or the lower reversing position. Specifically, for instance, the target number of pulses is reduced as the vehicle speed increases. Further, for instance, the target number of pulses is increased when the front windshield is in a semi-dried condition in which the resistance of the windshield surface becomes a maximum. The target number of pulses is decreased as the rainfall increases, because the resistance on the windshield surface is decreased.

Then, the CPU 21 checks at step 105 whether the wiper blade 1 has arrived at the pre-reversing position at the side of upper reversing position or the lower reversing position. The CPU 21 proceeds to step 106 to execute the deceleration control when the pre-reversing position is detected. Specifically, the CPU 21 counts the number of pulses produced from the rotation sensor 17. The CPU 21 produces to the drive circuit 26 the pulse width modulated signal corresponding to the pulse count value. Subsequently, the CPU 21 compares at step 107 the pulse count value with the target number of pulses. If it is less than the target number of pulses, the processing proceeds to step 108. At this time, the CPU 21 checks whether the current position of the wiper blade 1 is in the non-entering area. If it is not in the non-entering area, the CPU 21 proceeds to step 106 to continue the pulse width modulation (PWM) control.

That is, the CPU 21 controls the drive current of the wiper motor 5 based on the count value of the pulses produced after the wiper blade 1 arrived at the pre-reversing position, by repeating the processing of steps 106–108. Thus, the deceleration control of the motor rotation is executed.

If the CPU 21 determines at step 107 that the pulse count value has reached to the predetermined number, the CPU 21 proceeds to step 110 to produce a control signal to the drive circuit 26 thereby to reverse the direction of rotation of the wiper motor 5.

If it is determined at step 108 that the wiper blade 1 has entered into the non-entering area, the CPU 21 proceeds to step 111 and executes the dynamic braking. That is, the brushes of the wiper motor 5 are shorted to stop the rotation of the wiper motor 5. The CPU 21 corrects at step 112 the target number of pulses based on the count value at that time. For instance, the target number of pulses is set by decrementing one from the pulse count value. Then, the CPU 21 proceeds to step 110 to reverse the rotation of the wiper motor 5, and returns to step 104.

When the operation position of the wiper switch 27 is changed by the vehicle driver, the processing from step 100 is repeated. That is, the initial number of pulses is set anew for the "HI" or "LO" operation based on the operation position of the switch 27.

Figure 7:
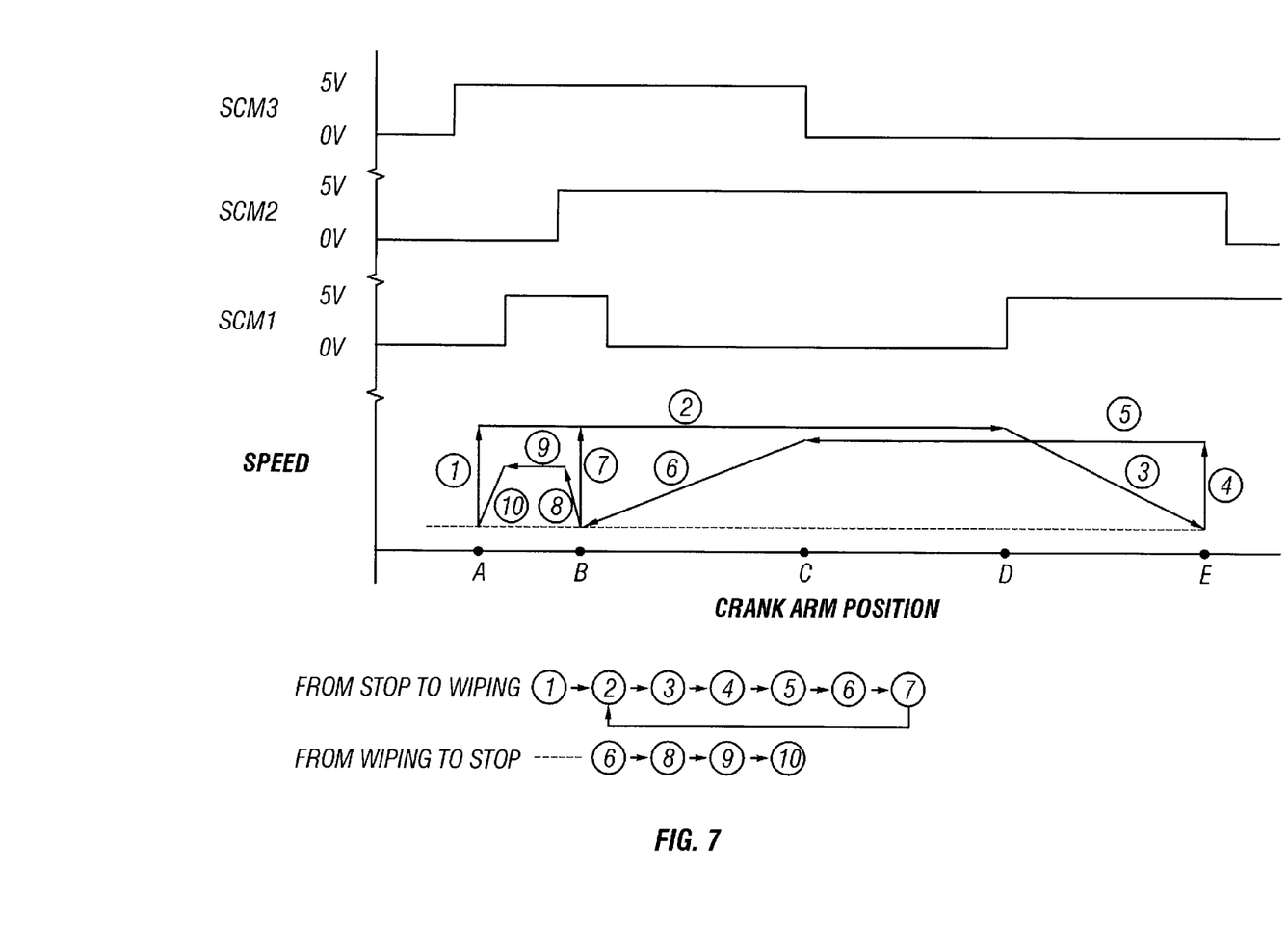
FIG. 7 is a timing diagram showing a wiper motor control in the embodiment.

Here, the operation of the present wiper control apparatus is described with reference to FIG. 7 which shows the operation in the case that the target number of pulses are set so that the wiper blade 1 is reversed when the crank arm 6 is at the point E and at the point B.

When the wiper switch 27 is operated to move the wiper blade 1 from the storage position to the upper pre-reversing position, the output of the position detection sensor 18 changes from the storage condition (001)to (101), (111), (011) and (010) in sequence. When the wiper blade 1 arrives at the upper pre-reversing position (crank arm 6 is at the position D) from the storage position, the output of the position detection sensor 18 changes from (010) to (110).

The deceleration control at the upper reversing position is effected in response to this change. Specifically, the duty ratio of the pulse width modulation signal is decreased to reduce the drive current of the wiper motor 5 based on the number of pulses produced after the upper pre-reversing position. When the pulse count value reaches the target number of pulses, that is, when the duty ratio becomes zero at the point E of the crank arm 6, the rotation speed of the wiper motor 5 becomes zero. Next, the direction of the drive current of the wiper motor 5 is changed to reverse the rotation of the wiper motor 5.

When the rotation of the wiper motor 5 is reversed, the processing for moving the wiper blade 1 from the upper reversing position to the lower reversing position is executed.

Specifically, until the lower pre-reversing position is detected, that is, until the crank arm moves from the point E to the point C, the rotation speed of the wiper motor 5 is controlled to a target rotation speed. At this moment, the output of the position detection sensor 18 changes from (110) to (010). When the wiper blade 1 arrives at the lower pre-reversing position (crank arm is at the point C), the output of the position detection sensor 18 changes from (010) to (011). The deceleration control for the lower reversing point is effected in response to this change. That is, the rotation speed of the wiper motor 5 is decelerated based on the pulse count value produced when the crank arm 6 moves from the point C to the point B. The rotation speed of the wiper motor 5 becomes 0 at the point B where the pulse count value reaches the target number of pulses, and the rotation of the wiper motor 5 is reversed.

After this, the rotation of the wiper motor 5 is controlled so that the wiper blade 1 attains the wiping operation over the wiping range between the lower reversing position and the upper reversing position.

Further, even when the wiper blade 1 enters into the non-entering area due to changes in the wiper load, the target number of pulses is corrected in the next wiping operation and the deceleration control is effected based on the target number of pulses. That is, the target number of pulses is corrected so that the wiper blade 1 is reversed before the wiper blade 1 arrives at the non-entering area, and the rotation speed of the wiper motor 5 is controlled to decelerate to 0 before the wiper blade 1 arrives at this area. As a result, the over-running of the wiper blade 1 is prevented.

When the wiper switch 27 is operated to the "PARK" position by the vehicle driver, the rotation of the wiper motor 5 is controlled to store the wiper blade 1 in the storage position after the wiper blade 1 is stopped at the lower reversing position. That is,the pulse width modulation signal is produced to the drive circuit 26 to move the crank arm 6 from the point B to the point A, and the drive current to the wiper motor 5 is adjusted to attain the rotation speed as shown in FIG. 7. Thus, the wiper blade 1 is stored in the storage position. As a result, shock sounds produced when the wiper blade 1 is stored is reduced by executing the storage control.

The following advantages are provided in the present embodiment described above.

(1) The wiping range of the wiper blade 1 can be adjusted with ease by only changing the initial setting of the number of pulses even when the present apparatus is applied to different vehicle types or the wiping range deviates due to deviation of the position of installation. Therefore, the wiper blade 1 is enabled to reverse at any positions between the pre-reversing position and the non-entering area. That is, the wiping range can be adjusted without changing the shape of the conductive plate 19 from type to type of the vehicle or changing the arrangement of the stationary contacts SCM1–SCM3. As a result, the same wiper motor 5 can be used in the different vehicle types. In addition, the wiper blade 1 is capable of wiping a wider area in correspondence with the windshield area.

(2) The rotation of the wiper motor 5 can be reversed immediately by effecting the dynamic braking when the wiper blade 1 moves into the non-entering area. Therefore, the overrunning of the wiper blade 1 can be prevented without fail.

(3) The target number of pulses is corrected when the wiper blade 1 moves into the non-entering area, because the wiping range is wide. That is, the wiping range is narrowed. Therefore, the normal wiping range can be set wide. Even when the over-running tends to occur, the wiping range is self-corrected and the wiper blade 1 can be reversed at the position in advance of the non-entering area. As a result, appropriate wiping range can be realized without taking into full consideration deviations in setting or condition of the windshield surface.

(4) The wiping range can be adjusted by correcting the target number of pulses in correspondence with the wetting condition of the windshield surface and the resistance of the running wind. Further, because the target number of pulses is set in correspondence with the wiper operation condition, that is, the operation position of the wiper switch 27, the wiping range can be adjusted even when the wiping operation speed of the wiper blade 1 changes.

(5) The drive current of the wiper motor 5 is controlled by the PWM control while the number of pulses produced after the pre-reversing position reaches the target number of pulses, and the rotation of the wiper motor 5 is controlled to decelerate. In the present embodiment, the duty ratio is reduced in correspondence with the number of pulses produced after the pre-reversing position in the PWM control so that the duty ratio is reduced to 0 at the reversing position. Thus, the wiper blade 1 is reversed after sufficiently decelerated. As a result, the noise generated at the time of reversing of the wiper blade 1 can be reduced.

(6) The pulses can be produced in response to the rotation before deceleration by providing the magnet ring 16 on the rotary shaft of the motor body. Thus, the resolution of control can be increased. Further, because the position of the wiper blade 1 is detected from the rotation position of the gear wheel 15 which is driven after reducing the rotation of the motor body, the position can be detected accurately with less inertia and vibration.

(7) In the present embodiment, the position detection sensor 18 is set so that the change of the contact condition changes only one of the contacts of the three contacts SCM1–SCM3. As a result, the contact timing does not vary in such a manner that the plural contacts SCM1–SCM3 changes the contact condition at the same time. The erroneous operation in the wiper motor control can be prevented by detecting the wiper blade position by the position detection sensor 18.

The above embodiment may be implemented in the following manner.

Although the PWM is effected at the time of reversing at the upper reversing point and the lower reversing point in the above embodiment, this may be eliminated. That is, the rotation of the wiper motor 5 may be stopped by the dynamic braking, when the pulse count value from the pre-reversing position reaches the target number of pulses. The direction of the drive current of the wiper motor 5 is reversed by the processing of step 110 in FIG. 6. In this instance, the wiping range can be adjusted by changing the target number of pulses.

The PWM control may be effected at the time of starting the wiper motor 5, because the rush current increases at that time. The excessive current which flows temporarily at the time of the wiper motor 5 can be prevented by this control.

A current detection circuit may be provided between the wiper motor 5 and the drive circuit 26 as wiper load detecting means so that the load exerted on the wiper motor 5 is detected based on the detected current value. The target number of pulses may be corrected based on the load of the wiper motor 5. With this construction, the wiping range can be adjusted appropriately as well.

The drive current flowing in the wiper motor 5 varies with the rotation of the motor. That is, the period of variation changes with the rotation of the wiper motor 5. Therefore, the current detection circuit for detecting the drive current of the wiper motor 5 may be used as pulse generating means in place of the rotation sensor 17 in the above embodiment, so that the pulses may be produced in correspondence with the rotation of the wiper motor 5 in response to the periodic changes of the drive circuit. In this instance as well, the wiping range can be adjusted with ease.

The target number of pulses for reversing the wiper blade 1 may be set to different values between the cases of reversing at the upper reversing position and the lower reversing position. If the noise level differs between the upper reversing time and the lower reversing time, the target number of pulses is set to a larger value and a smaller value for the reversing which produces a larger noise and a smaller noise, respectively. In this instance, because the wiper blade 1 is reversed after being sufficiently decelerated at the reversing which produces a comparatively large noise, the noise can be reduced to a preferable level from the practical standpoint.

Further, the correction of the target number of pulses (step 112 in FIG. 6) at the time of arrival of the wiper blade 1 at the non-entering area may be effected separately between the reversing at the upper reversing position and the lower reversing position. In this instance, changes in the position of reversing at the upper reversing position and the lower reversing position can be adjusted separately. That is, the wiping area can be effected appropriately.

Although the wiping range is corrected with the detection values of the vehicle speed sensor 28 and the rain drop sensor 29 in the above embodiment, either or both of the corrections may be eliminated. Further, the correction of the wiping range based on the operation position of the wiper switch 27 may also be eliminated.

The wiper control apparatus shown in FIG. 1 need not use the crank arm 6, link rod 4, lever 3 and the like, and instead the apparatus may be constructed so that the wiper arm 2 is directly coupled to the output shaft 7 of the wiper motor 5 as shown in FIG. 8.

Although the wiper blade 1 is stored in the storage position in the above embodiment, the present invention may be applied to a wiper control apparatus which does not have this storage function.

The initial number of pulses for setting the target number of pulses may be stored in the ROM 22, and may be stored in a rewritable memory such as an EEPROM. The wiping range can be adjusted with ease and practically preferably, particularly in the case of storing in the rewritable memory.

The pulse count value at the time of arrival of the wiper blade 1 at the non-entering area may be stored in an EEPROM or a backup RAM, and the target number of pulses may be set in correspondence with the stored pulse count value when the wiper switch 27 is turned on next time. In this instance, the wiper blade 1 can be restricted from moving into the non-entering area too often.

The wiper control apparatus according to the above embodiment may be applied widely to vehicles such as buses, trucks and passenger cars. Further, the wiper control apparatus may be applied to a rear wiper, although it is applied to a front wiper in the above embodiment.

As described in detail, the present invention enables adjustment of the wiping range of a wiper blade. Therefore, the adjustment can be effected with ease even when applied to different vehicle types. Further, variations of the wiping range due to errors in assembling can be adjusted with ease.

What is claimed is:

1. A wiper control apparatus comprising:
   a wiper motor for driving a wiper blade reciprocally between an upper reversing position and a lower reversing position;
   a drive circuit for driving the wiper motor in forward and reverse directions;
   wiper position detecting means for detecting an arrival of the wiper blade at a predetermined pre-reversing position defined inside of at least one of the upper reversing position and the lower reversing position;
   motor rotation detecting means for producing rotation pulses in response to rotation of the wiper motor to detect a rotational position of the wiper motor;
   control means for counting the number of pulses produced after a detection of the arrival of the wiper blade at the pre-reversing position, and commanding the drive circuit to reverse the rotation of the wiper motor when the counted number reaches a predetermined number,
   wherein the wiper motor is rotated continuously in the forward and reverse directions by a repetition of reversing of the rotation of the wiper motor, wherein:
      the wiper position detecting means is for further detecting an arrival of the wiper blade at an allowable limit position defined at an outside of the reversing position; and
      the control means is for further commanding the drive circuit to reverse the rotation of the wiper motor, when the arrival of the wiper blade at the allowable limit before the counted number reaches the predetermined number.

2. A wiper control apparatus of claim 1, further comprising:
   pulse number correcting means for correcting the predetermined number to reverse the wiper blade at a position inside of the allowable limit position, when the arrival of the wiper blade at the allowable limit is detected before the counted number reaches the predetermined number.

3. A wiper control apparatus of claim 1, further comprising:
   wiper load detecting means for detecting a load exerted on the wiper blade in a wiping operation of the wiper blade; and
   load correcting means for correcting the predetermined number in correspondence with the detected wiper load.

4. A wiper control apparatus of claim 1, wherein:
   the control means is for commanding the drive circuit to drive the wiper motor at a decelerated speed by a pulse width modulated signal in response to the rotation pulses until the counted number reaches the predetermined number.

5. A wiper control apparatus of claim 4, wherein:
   the control means is for commanding the drive circuit to reduce a duty ratio of the pulse width modulated signal gradually from a time of the arrival of the wiper blade at the pre-reversing position so that the duty ratio is reduced to zero when the counted number reaches the predetermined number.

6. A wiper control apparatus of claim 1, wherein:
   the wiper motor has a motor body and a speed reduction mechanism which transmits a rotation of the motor body after reduction of the speed by a reduction gear.

7. A wiper control apparatus of claim 6, wherein:
   the motor rotation detecting means has a rotor mounted on a rotary shaft of the motor body, and a detector provided in non-contact relation with the rotor for producing the rotation pulses in response to a rotation of the rotor.

8. A wiper control apparatus of claim 1, wherein:
   the wiper position detecting means includes a stationary contact, and a movable contact fixed to a rotary body for sliding over the stationary contact in response to the rotation of the wiper motor; and
   the stationary contact and the movable contact are constructed to be able to contact each other at a plurality of points and to change a contact condition at only one of the points in response to a movement of the movable contact.

9. A wiper control apparatus of claim 8, wherein:
   the wiper motor has motor body and a speed reduction mechanism which transmits a rotation of the motor body after reduction of the speed by a reduction gear; and
   the movable contact is provided on a side surface of the speed reduction gear and has a plurality of conductive trucks shaped in a predetermined pattern in correspondence with a wiping position of the wiper blade.

10. A wiper control apparatus of claim 1, wherein:
    the wiper motor has an output shaft directly coupled with a wiper arm.

11. A wiper control apparatus comprising:
    a wiper motor for drving a wiper blade reciprocally between a first and second reversing positions;
    a drive circuit for driving the wiper motor in forward and reverse directions;
    wiper position detecting means for detecting an arrival of the wiper blade at a predetermined pre-reversing position defined in advance of at least one of the first and second reversing positions;
    motor rotation detecting menas for producing rotation pulses in response to rotation of the wiper motor to detect a rotational angle of the wiper motor;
    control means for counting the number of pulses produces after the detection of arrival of the wiper blade at the pre-reversing position, and commanding the drive circuit to reverse the rotation of the wiper motor when the rotational position reaches a predetermined angle so that the rotation of the wiper motor is reversed at the predetermined angle from the pre-reversing position,
    wherein the wiper motor is rotated continuously in the forward and reverse directions by a repition of reversing of the rotation of the wiper motor, wherein:
       the wiper position detecting means is for further detecting an arrival of the wiper blade at an allowable limit position defined at an outside of the reversing position; and the control means is for further commanding the drive circuit to reverse the rotation of the wiper motor, when the arrival of the wiper blade at the allowable limit position before the rotational angle of the wiper motor reaches the predetermined angle from the pre-reversing position.

12. A wiper control apparatus of claim 11, further comprising:

pulse number correcting means for correcting the predetermined angle to reverse the wiper blade at a position inside of the allowable limit position, when the arrival of the wiper blade at the allowable limit position is detected before the rotational angle of the wiper motor from the pre-reversing position reaches the predetermined angle.

13. A wiper control apparatus of claim 11, further comprising:

wiper load detecting means for detecting a load exerted on the wiper blade in a wiping operation of the wiper blade; and load correcting means for correcting the predetermined angle in correspondence with the detected wiper load.

14. A wiper control apparatus of claim 11, wherein:

the control means is for commanding the drive circuit to drive the wiper motor at a decelerated speed by a pulse width modulated signal in response to the rotation pulses until the rotational angle of the wiper motor from the pre-reversing position reaches the predetermined angle.

15. A wiper control apparatus of claim 14, wherein:

the control means is for commanding the drive circuit to reduce a duty ratio of the pulse width modulated signal gradually until the rotational angle of the wiper motor from the pre-reversing position reaches the predetermined angle so that the duty ratio is reduced to zero when the rotational angle reaches the predetermined angle.

16. A wiper control apparatus of claim 11, wherein:

the wiper motor has a motor body and a speed reduction mechanism which transmits a rotation of the motor body after reduction of the speed by a reduction gear.

17. A wiper control apparatus of claim 16, wherein:

the motor rotation detecting means has a rotor mounted on a rotary shaft of the motor body, and a detector provided in a non-contact relation with the rotor for producing the rotation pulses in response to a rotation of the rotor.

18. A wiper control apparatus of claim 11, wherein:

the wiper position detecting means includes a stationary contact, and a movable contact fixed to a rotary body for sliding over the stationary contact in response to the rotation of the wiper motor; and the stationary contact and the movable contact are constructed to be able to contact each other at a plurality of points and to change a contact condition at only one of the points in response to a movement of the movable contact.

19. A wiper control apparatus of claim 18, wherein:

the wiper motor has motor body and a speed reduction mechanism which transmits a rotation of the motor body after reduction of the speed by a reduction gear;

the movable contact is provided on a side surface of the speed reduction gear and has a plurality of conductive trucks shaped in a predetermined pattern in correspondence with a wiping position of the wiper blade; and the stationary contact has a plurality of contact brushes fixed to a casing accommodating the speed reduction gear.

20. A wiper control apparatus of claim 11, wherein:

the wiper motor has an output shaft directly coupled with a wiper arm.

21. A wiper control method for driving a wiper blade by a wiper motor between two reversing positions on a windshield, comprising the steps of:

detecting an arrival of the wiper blade at a pre-reversing position defined inside of the two reversing positions;

measuring an angle of rotation which the wiper motor makes after the detecting step detects the arrival at the pre-reversing position; and reversing a direction of current supplied to the wiper motor when the measured angle of rotation reaches a target value variable with a parameter indicative of a wiping operation of the wiper blade, wherein:

the parameter includes an over-running of the wiper blade beyond at least one of the two reversing positions.

22. A wiper control method of claim 21, wherein:

the target value is decreased when the over-running is detected.

23. A wiper control method of claim 22, further comprising the step of:

decreasing the current gradually after the arrival of the wiper blade at the pre-reversing position until the measured angle reaches the target value, wherein the reversing step dynamically brakes the wiper motor and reverses the direction of the current immediately when the over-running is detected before the measured angle reaches the target value.

24. A wiper control method of claim 21, wherein:

the parameter includes a load exerted on the wiper blade; and the target value is set in accordance with the load of the wiper blade.

25. A wiper control method of claim 21, wherein:

the step of measuring the angle includes a step of counting the number of pulses produced every predetermined angular rotation of the wiper motor.

* * * * *